United States Patent [19]
Rye

[11] Patent Number: 5,168,682
[45] Date of Patent: Dec. 8, 1992

[54] PLASTIC LINERS FOR CONCRETE STRUCTURAL ELEMENTS AND THE ELEMENTS AND STRUCTURES PRODUCED THEREBY

[76] Inventor: Palle Rye, 20 Fawn Dr., Reading, Pa. 19607

[21] Appl. No.: 593,828

[22] Filed: Oct. 5, 1990

[51] Int. Cl.⁵ .............................................. E03F 3/04
[52] U.S. Cl. ................................. 52/309.17; 52/245; 52/19; 52/247; 264/33; 264/274
[58] Field of Search ............... 52/19, 309.17, 20, 245, 52/247; 264/33, 274

[56] References Cited

U.S. PATENT DOCUMENTS

| | | | |
|---|---|---|---|
| 1,106,150 | 8/1914 | Martin | 52/19 |
| 1,888,039 | 11/1932 | Huff. | |
| 2,331,140 | 10/1943 | Schmidt. | |
| 2,816,323 | 12/1957 | Munger. | |
| 3,562,056 | 2/1971 | Olson. | |
| 3,848,034 | 11/1974 | Schaefer. | |
| 4,112,979 | 9/1978 | Widdicombe. | |
| 4,578,235 | 3/1986 | Schmidgall et al.. | |
| 4,670,315 | 2/1987 | Hillemeier et al.. | |
| 4,751,799 | 6/1988 | Ditcher et al.. | |
| 4,834,428 | 5/1989 | Pritchatt. | |

FOREIGN PATENT DOCUMENTS 2918275 7/1979 Fed. Rep. of Germany.

OTHER PUBLICATIONS

Product catalog of Friedrichsfeld GmbH Technical Plastics Division, "Corrosion protection for concrete and reinforced concrete pipes, special profiles, bowls and manholes with the BKU–system".
Southwest Concrete Products brochure entitled "Precast Concrete Manholes".

Primary Examiner—David A. Scherbel
Assistant Examiner—Wynn E. Wood
Attorney, Agent, or Firm—Panitch Schwarze Jacobs & Nadel

[57] ABSTRACT

Plastic linings in the form of synthetic polymeric plastic resiliently flexible sheets are disclosed having matingly engagable connector structures along their opposing edges to permit mated engagement of adjoining sheets to form a continuous lining. The sheets have a uniform transverse cross section which extends from one end of the sheet to an opposing end of the sheet to permit extrusion of each sheet. Y-shaped engagement members are preferably provided to better secure the sheet to the surface of a concrete body of a concrete structural element being lined with the sheet. The matingly engaged connectors further provide a compression joint between mated, adjoining sheets. The sheets may also be bonded together along the joints to provide a fluid-impervious seal between the mated sheets. L-shaped synthetic polymeric plastic end members are further bonded to the sheet at corners of the concrete body where the sheets end to provide smooth, protected surfaces for coupling elements together.

27 Claims, 3 Drawing Sheets

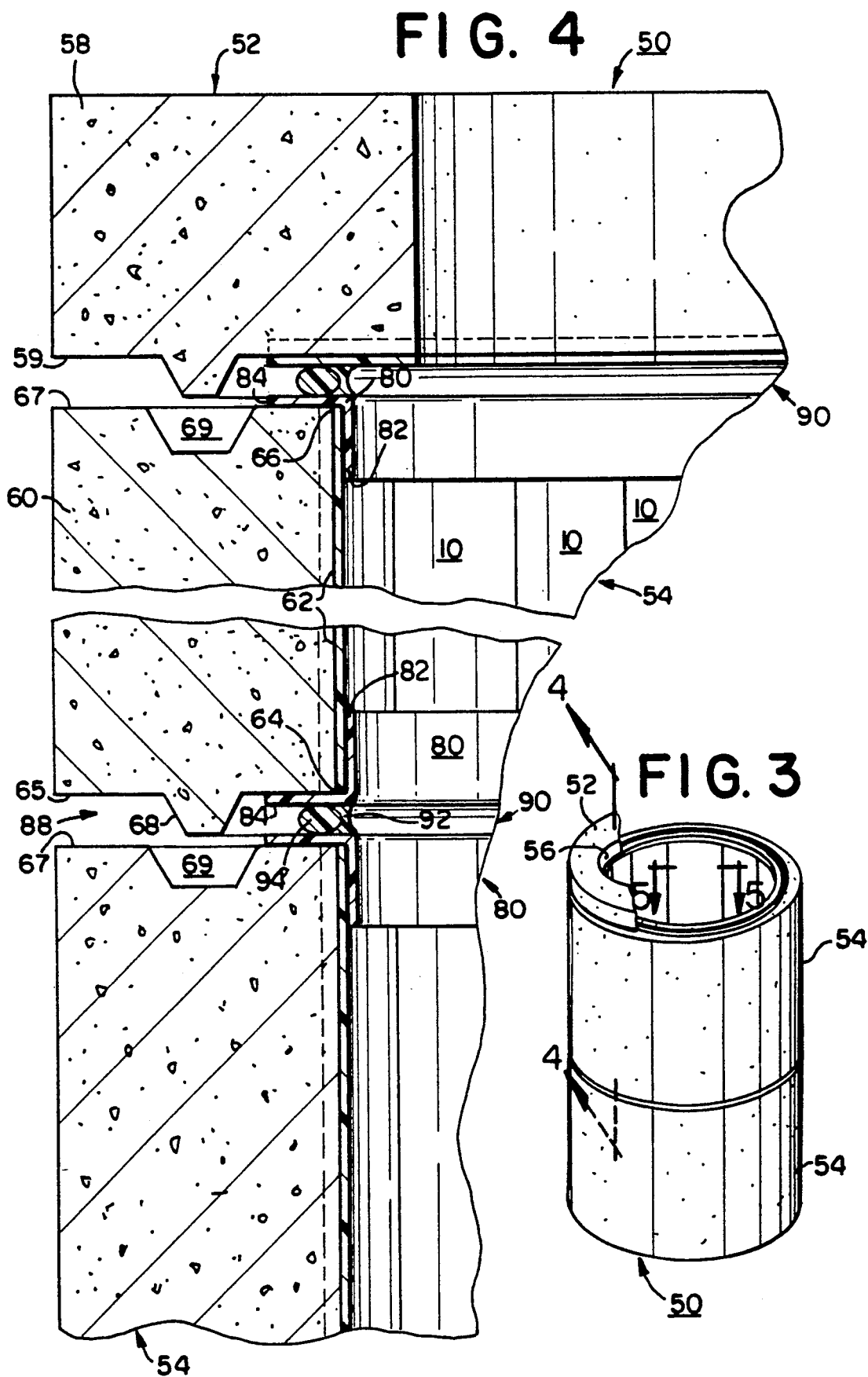

PLASTIC LINERS FOR CONCRETE STRUCTURAL ELEMENTS AND THE ELEMENTS AND STRUCTURES PRODUCED THEREBY

FIELD OF THE INVENTION

The invention relates to concrete structural elements and, more particularly to plastic linings for such elements and the concrete structures which can be produced therefrom, particularly those used in waste disposal and other drainage systems.

BACKGROUND OF THE INVENTION

Concrete is a preferred material for the construction of waste disposal systems, particularly lines and manholes. Concrete is relatively strong, inert and inexpensive, making it an ideal construction material. However, concrete is subject to corrosion from the acids, alkalis and salts, which are often present in the waste being removed, and particularly sulfide gases which are inevitably present. Sulfide attack can severely impair the operating life of unprotected concrete conduit systems.

It has been known for some time that the concrete of such waste disposal systems can be protected from sulfide attack by the provision of the suitable barrier between the waste fluids and the concrete. A number of plastic materials have been proposed for the protection of concrete under such operating conditions. For example, U.S. Pat. No. 4,670,315 discloses the application of a synthetic resin or plastic typically comprising a polyester, epoxide, polyurethane, acrylic, polyester or like resin to concrete. U.S. Pat. No. 4,578,235 discloses the use of polyvinyl chloride (PVC). U.S. Pat. No. 4,112,979 identifies in addition to modified or unmodified "rigid" PVC, polypropylene copolymers, polypropylene, acrylonitrile-butadiene-styrene, polycarbonate, polyacetal and polyethylene. Still other plastic lining materials are believed to have been used and suggested.

The protective plastic lining has been applied to the concrete body forming the pipe sections or manhole sections of such drainage systems in a variety of ways. U.S. Pat. No. 4,670,315 discloses the application of a synthetic resin or plastic directly to the concrete surface by spraying, rolling or troweling.

U.S. Pat. No. 4,578,235 discloses a process for manufacturing lined pipe in which a continuous flexible plastic sheet 107 is wound partially around a cylindrical mandrel to form a cartridge 22 which is thereafter inserted into a pipe-forming machine for the application of concrete around the cartridge to complete the formation of a lined concrete pipe. The liner disclosed in this patent extends only partially around the inner tubular or circumferential surface of the resulting pipe.

U.S. Pat. No. 3,562,056 discloses the on site construction of continuous, lined, concrete drainage pipe using an apparatus moved through a trench in which the pipe is located. The plastic lining in U.S. Pat. No. 3,562,056 is provided by individual formed plastic sections having connectors along their opposing edges. The linings are coupled together with their connectors extending circumferentially to provide a continuous, longitudinally extending lining. However, the lining extends over only an upper portion of the inner circumferential surface of the formed pipe which is exposed to the sulfide gases.

U.S. Pat. No. 2,816,323 discloses concrete pipes fully lined with plastic. A flexible length of plastic lining is rolled upon itself and two longitudinally extending, opposing edges overlapped to form a lap joint and provide a continuous inner circumferential surface. Lapped ends of the sheet are joined in a suitable manner such as by heat welding or the application of an adhesive or solvent.

U.S. Pat. No. 4,751,799 also discloses fully lining concrete pipe with plastic by the provision of a plurality of identical, vacuum-formed plastic sheet segments having adjoining longitudinally extending edges. The segments are joined together through separate mechanical joining members. Each lining also has a second pair of opposing edges which are turned generally perpendicularly to the remainder of the sheet to form annular exposed surfaces of the tubular ends of the resulting pipe. These end surfaces provide uniform, corrosion-resistant mating surfaces for end-to-end coupling of identical pipes. Butyl, silicone or other suitable caulking material is provided between the plastic end surfaces to provide a liquid-tight, corrosion-resistant seal in the joint.

U.S. Pat. No. 4,670,315 describes the process by which water vapor tends to diffuse from the soil through the concrete to the interface between the concrete and the plastic lining, creating an internal pressure which tends to separate the lining from the concrete. That patent suggests the use of a concrete bonding layer containing fibers projecting from the layer on which the plastic resins which are applied as the lining in that patent may anchor. U.S. Pat. Nos. 2,816,323, 4,578,235 and 4,751,799, for example, disclose the provision of preformed plastic linings having anchoring or engagement members which project outwardly from the linings and which flare outwardly in a direction generally parallel to the major adjoining surface of the plastic lining while projecting so as to be interferingly embedded in the concrete preventing pullout.

SUMMARY OF THE INVENTION

In one aspect, the invention is a resiliently flexible, synthetic polymeric plastic sheet. The sheet is used to form a plastic lining in concrete structural elements. The sheet comprises a pair of opposing, major sides. The sheet further has a pair of opposing first and second edges extending along a length dimension of the sheet. The length dimension is perpendicular to a width dimension of the sheet. The width dimension extends between the first and second edges. One major side of the sheet is provided for exposure on a concrete structure. The sheet further comprises first and second connectors projecting transversely from a remaining major side of the sheet. The first and second connectors extend respectively along the first and second edges. The first and second connectors are configured to matingly engage with connectors substantially identical to the second and first connectors, respectively. These would be provided on other, similar sheets. The sheet has a cross-sectional width profile unchanging along the length dimension of the sheet.

In another aspect, the invention is also a resiliently flexible, synthetic polymeric plastic sheet comprising a pair of opposing, major sides. The sheet has a pair of opposing first and second edges extending along a length dimension of the sheet. The length dimension is perpendicular to a width dimension of the sheet which extends between the first and second edges. One major side of the sheet is provided for exposure on a concrete structure. The sheet further comprises first and second connectors projecting transversely from a remaining major side. The first and second connectors extend respectively along the first and second edges. The first and second connectors are configured to matingly engage with connectors substantially identical to the second and first connectors, respectively. These would be provided on other, similar sheets. Each of the first and second connectors is further configured to engage by interference with cured concrete when the connector is embedded in concrete up to the remaining side of the sheet before the concrete has cured.

In yet another aspect, the invention is a concrete structural element which comprises a concrete body at least substantially defining the element and first and second adjoining, resiliently flexible, synthetic polymeric plastic sheets on a surface of a concrete body. Each of the first and second sheets includes a pair of opposing, major sides. One major side of each sheet forms an exposed surface of the element. A remaining major side of each sheet faces and intimately contacts the surface of the concrete body. Each sheet has a pair of opposing first and second edges extending along the length dimension of the sheet. The length dimension of each sheet is perpendicular to a width dimension of the respective sheet which extends between the first and second edges of the respective sheet. Each sheet further includes first and second connectors projecting transversely to the remaining major side of the sheet and extending respectively along the first and second edges of the sheet. The first connector of the first sheet matingly engages with the second connector of the second sheet. Each of the first and second sheets has a cross-sectional width profile which is unchanging along the length dimension of the sheet. The engaged first and second connectors project from the remaining sides of the first and second sheet into the concrete of the concrete body and are at least partially embedded in the concrete for at least partially securing the first and second sheets to the body.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings, embodiments which are presently preferred. It should be understood, however, that the invention is not limited to the precise arrangements and instrumentalities shown. In the drawings:

FIG. 3 depicts [diagrammatically] in a perspective, partially broken away view, a concrete structure in the form of a capped manhole constructed of concrete structural elements which are plastic lined according to the present invention;

FIG. 4 is a broken, [diagrammatic] elevation cross section of a portion of the manhole taken along the lines 4—4 of FIG. 3;

DETAILED DESCRIPTION OF PREFERRED EMBODIMENTS

Figure 1:
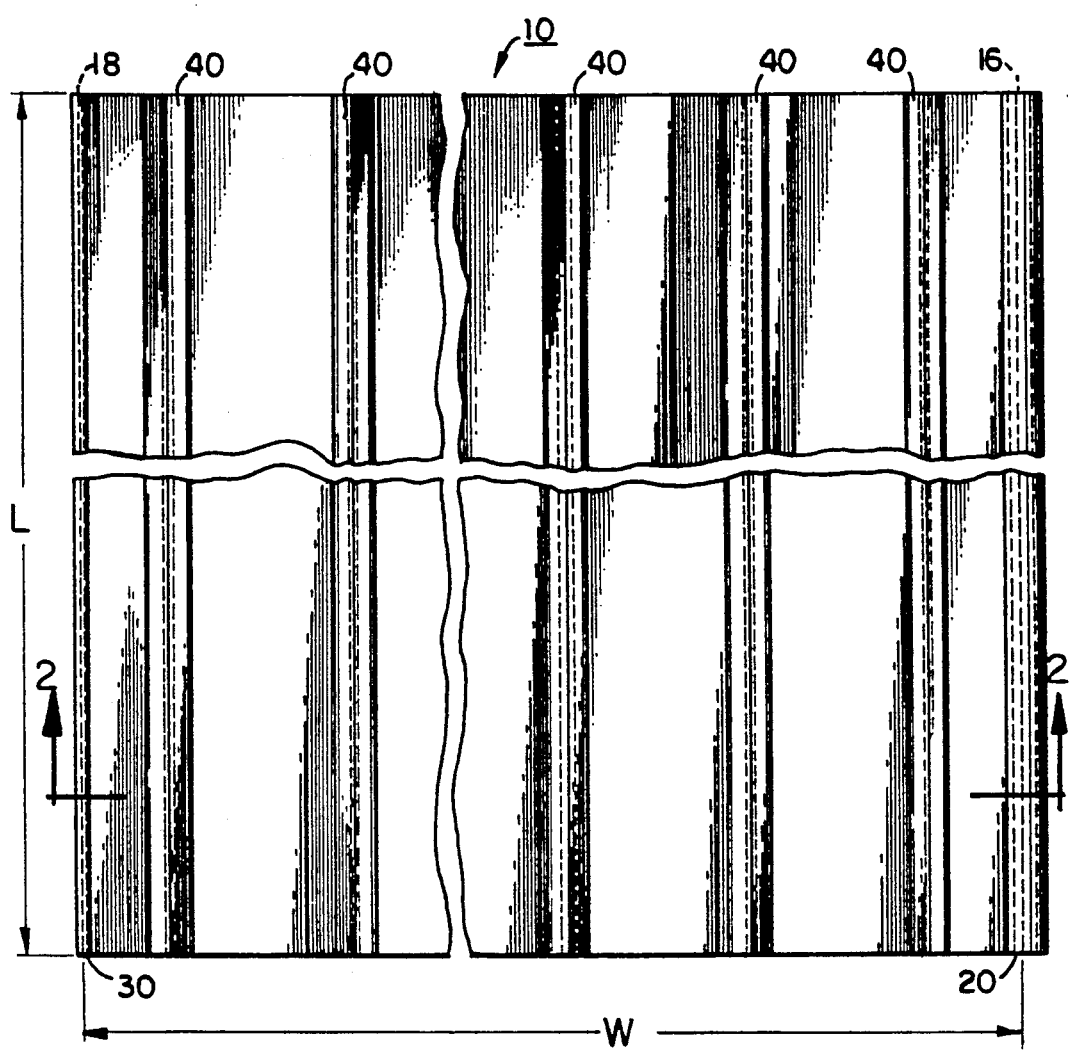
FIG. 1 is a broken, [diagrammatic] plan view of a preferred, resiliently flexible, synthetic polymeric plastic sheet according to the present invention for use in lining a concrete structural element.
Figure 2:
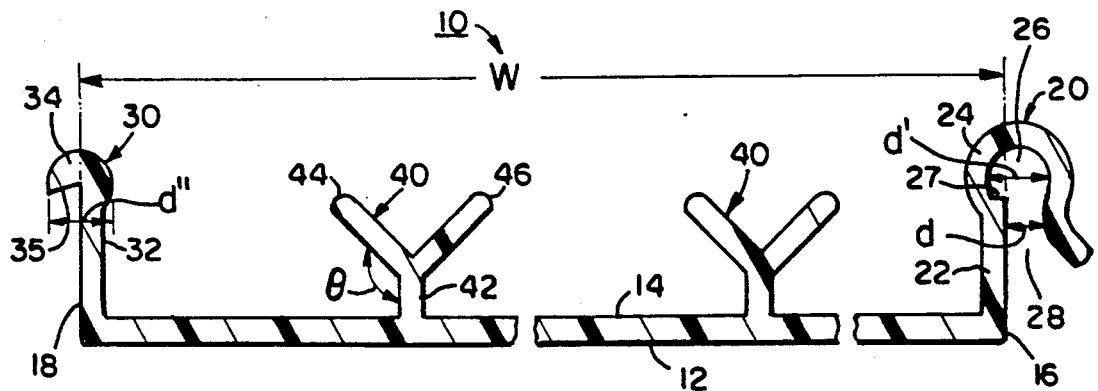
FIG. 2 is a broken, [diagrammatic] cross-sectional view of the sheet taken along the lines 2—2 of FIG. 1, substantially perpendicular to a length dimension of the sheet, depicting the cross-sectional width profile of the sheet.

Referring now to FIGS. 1-2, there is shown resiliently flexible, synthetic polymeric plastic sheet 10 according to one presently preferred embodiment of the present invention. FIG. 1 is a top plan view of the sheet shown in cross-sectional-width profile in FIG. 2. FIG. 2 has been enlarged with respect to FIG. 1. The sheet 10 has been broken at different places in both FIGS. 1 and 2 to fit within the marginal constraints of the drawings. However, its structure will be apparent from the following description.

The sheet 10 includes a pair of opposing, major sides indicated at 12 and 14, respectively. One major side 12 of the sheet preferably is substantially smooth, as seen in FIG. 2. This side of the sheet 10 is used to provide an exposed, smooth surface in the structural concrete element incorporating the plastic sheet 10. The sheet 10 further has a pair of opposing first and second edges 16 and 18, respectively, extending along a length dimension of the sheet 10, indicated by "L" in FIG. 1. The length dimension L is perpendicular to a width dimension of the sheet 10, indicated by "W" in FIGS. 1 and 2 which extends between the pair of edges 16 and 18. The sheet 10 further comprises first and second connectors, indicated generally at 20 and 30, respectively, projecting transversely from the remaining major side 14 of the sheet and extending respectively along the first and second edges 16 and 18, preferably along the entire length L of the sheet 10. The first and second connectors 20 and 30 are configured to matingly engage with one another and with connectors at least substantially identical thereto which would be provided on other similar, preferably identical sheets.

Preferably, the first connector 20 includes a stem 22 preferably projecting generally perpendicularly from the remaining major side 14 along first edge 16. Supported at an end of the stem 22 remote from the remaining side 14 is a hook-shaped structure indicated generally at 24. The hook-shaped structure 24 has a cavity 26 including an open mouth 28. The second connector 30 comprises a stem 32 preferably projecting generally perpendicularly from the remaining side 14 of the sheet 10 along the second edge 18 and supporting at an end remote from the remaining side 14 a generally bulbous structure indicated at 34 in FIG. 2. The first and second connectors 20 and 30 are configured to matingly engage one another. In particular, the mouth 28 of the first connector is open "downwardly" so as to receive the bulbous structure or portion 34 of the second connector 30 when two identical sheets 10 are placed side-by-side along their adjoining corresponding longitudinal edges 16 and 18, respectively. This arrangement of the connectors 20 and 30 permits the one side 12 of the sheet to be preferably smooth and uniformly planar or curvilinear or textured in any desired way for exposure on the concrete while the attachment of the two sheets to one another occurs through structures which are provided essentially on the remaining side of such sheets. The mouth 28 has a width dimension "d", generally parallel to the width dimension W and perpendicular to the length dimension L of the sheet 10, which is less than a larger dimension "d'" of the cavity 28. The width dimension d of the open mouth 28 is further less than a larger dimension "d''''" of the bulbous portion 34 of the second mating connector 30 so that the bulbous portion 34 of the second connector 30 is retained within the cavity 28 when the larger bulbous structure 34 is positioned within the cavity 26 with its stem 32 extending through the open mouth 28. In this way, an interference rather than a strictly frictional fit is provided which permits sheets like the sheet 10 to be joined through their connectors by sliding the second connectors thereof through the cavity of the first connectors thereof. Also in this way, the need to provide or attach additional separate connector parts and to hold the sheets in alignment while additional separate connector parts are attached or provided can be avoided.

In addition to the first and second connectors 20 and 30, the sheet 10 is preferably provided with one and, more preferably, a plurality of additional engagement members to further assist in securing the sheet 10 to the concrete body of a structural element. Preferably, generally Y-shaped engagement members, each indicated at 40 in FIGS. 1 and 2, can be provided projecting from the remaining major side 14. Each Y-shaped engagement member 40 includes a base or stem 42 preferably extending generally perpendicularly from the remaining major side 14 of the sheet 10 and a pair of arms 44 and 46 supported by the base 42 and diverging from one another and from the remaining major side 14 of the sheet. Preferably, the Y-shaped engagement members 40 are provided at substantially uniform spacings from one another across the width dimension W of the sheet. Furthermore, it is preferred that the Y-shaped engagement members extend in generally parallel planes with respect to one another and with respect to the first and second connectors 20 and 30, respectively, and edges 16 and 18, entirely along the length L of the sheet. The planes just referred to extend vertically in FIGS. 1 and 2 and perpendicularly to the plane of each figure.

The Y-shape is generally preferred to a generally "T" shape as the greater included angle Θ between each arm 44 and 46 and the base 42 is greater than the right included angle provided on a T-shaped member. This permits concrete to work more easily into the included angle from a direction facing the remaining major side 14 (i.e., from a direction above side 14 in FIG. 2) and prevents the occurrence of voids in the concrete about the engagement member. Otherwise, it might be necessary to alter a preferred concrete mix in order to obtain sufficient flow to pass around and beneath the arms 44, 46. Preferably, the arms 44 and 46 extend at about a forty-five degree angle with respect to the remaining major side 14 so as to provide a ninety degree included angle between the arms 44 and 46. Also the thickness of the base 42 is less than twice the thickness of each arm 44 and 46 and, preferably, about the same thickness as each arm, to form a gap in the concrete where the base 42 is positioned narrower than the combined thicknesses of the arms 44 and 46.

According to an important aspect of the invention, the sheet 10 preferably has a cross-sectional width profile, which is indicated in broken form in FIG. 2, which is unchanging along the length dimension L of the sheet. Thus, the first and second connectors 20 and 30 and each of the Y-shaped engagement members 40 preferably extends along the entire length dimension L of the sheet 10. This configuration permits the sheet 10 to be extruded in its final used form, and the relatively quick, easy and inexpensive manufacture of the sheets 10 in large quantities. When the sheet 10 is extruded, the first and second connectors 20, 30 and Y-shaped engagement members 40 are integrally and monolithically formed with the sheet 10 as part of the sheet 10. The sheets could, of course, be integrally and monolithically molded, if desired, or less desirably constructed of joined elements.

The sheet 10 is preferably made from a synthetic polymeric plastic material. As has been indicated, a number of materials have been used or suggested as a plastic lining for concrete pipe and related structural members used in sewage systems. The plastic material selected should be at least substantially chemically inert and resistant to oxidation, acids, alkalis, salts and petroleum, vegetable and/or animal based oils, fats and greases. It should be particularly resistant and impermeable to sewage liquid and gases, particularly sulfides typically present in such gases, and should further be nonconducive to bacterial or fungal growth. ASTM type I "rigid" polyvinyl chloride with a minimum wall thickness of about 0.080 inch (about 2 mm) is preferred. This also conforms to National Pipe Manufacturers' Association standards for such piping. PVC in the type and thickness indicated is considered to be "rigid" compared with other plastics particularly "soft" PVC. Nevertheless, that material in the indicated thickness is resiliently flexible and can be readily bent from a generally planar configuration in which it may be extruded to a convex/concave configuration to permit its use as concrete conduit lining.

According to yet another important aspect of the invention, sheets 10 of the present invention have a width dimension W between their opposing first and second, longitudinally extending edges 16 and 18, which is about pi times an integer. For example, width W of sheet 10 in FIG. 2 might be about 12.57 inches between the edges 16 and 18. This dimension is about four (4) times pi. The integer can relate to metric measurements or any other conventional length measurement system. Such a width dimension permits the sheet to be concavely flexed from the one smooth major side 12, and preferably, permits the sheet to be joined by the respective connectors 20, 30 with similar, preferably identical, sheets having the same width dimensional constraints, to provide a tubular form of mated sheets having a diameter which is equal to some integer measurement. For example, 9 sheets having a width of about 12.57 inches would be joined together to line a pipe having an inner diameter of about 3 feet. Sheets 10 can be provided in standard lengths L such as, for example, lengths between one and twenty feet, which are conventional for the sewage system concrete structural element(s) suggested for lining with the sheets 10. Alternately, or in addition, the sheets can be provided in one or a very few standard lengths and cut to the desired end length by the user.

Referring now to FIGS. 3 and 4, there is partially depicted in differing detail, a concrete conduit structure, in particular a flat-topped concrete manhole indicated generally at 50, formed by three mated concrete structural elements of the present invention, in particular, a concrete flat top section indicated at 52 and a pair of circular sections 54. The flat top section 52 typically includes an access opening a portion of which is indicated at 56. The opening 54 may be eccentrically located on the flat top 52 which is itself typically circular in form. Other circular sections, guide rings and other known structural elements can additionally be provided.

Figure 5:
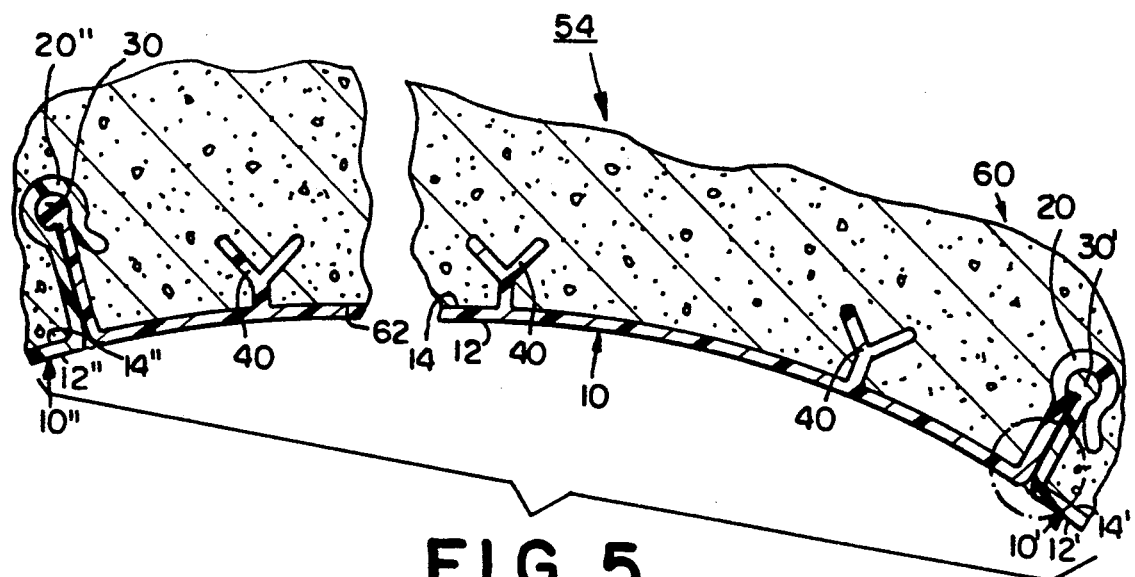
FIG. 5 is a [diagrammatic] plan cross-section of one tubular concrete element of the manhole taken along the lines 5—5 of FIG. 3.

A more detailed view of the construction of each of the elements 52 and 54 is provided in the section views of FIGS. 4 and 5. Referring to FIG. 4, the upper circular section 54 includes a cylindrically tubular concrete body 60 at least substantially defining the element 54 and a plurality of adjoining, resiliently flexible, synthetic polymeric plastic sheets 10 of the invention, which are mounted on the inner circumferential surface 62 of the body 60. As is seen in both FIGS. 4 and 5, the remaining major side 14 of each sheet 10 faces and intimately contacts the inner circumferential surface 62 of the concrete body 60.

Referring particularly to FIG. 5, the three sheets partially depicted are labeled 10", 10 and 10', respectively, for clarity. The first connector 20 of the central sheet 10 is matingly engaged with a second connector, indicated at 30' of a second, preferably identical sheet 10', coupling the first and second sheets 10 and 10' together along their adjoining, longitudinally extending edges. On the left side of FIG. 5, a first connector indicated at 20" of a third sheet indicated at 10" for clarity is matingly engaged with the second connector 30 of the first sheet 10 in an identical manner to the engagement between connector 20 and 30', coupling those sheets 10, 10" together along their adjoining longitudinally extending edges. As previously explained, the bulbous structure at the end of each of the second connectors is received in the cavity of the hook-shaped structure of the respective first connector with the stem of the second connector extending through the open mouth of the hook-shaped structure. The bulbous structure 34 of each second connector has a dimension parallel to the width dimension of the sheet which is greater than a corresponding dimension of the mouth so that the bulbous structural portion 34 of each second connector 30 is retained by interference in the cavity.

As can best be seen in FIG. 5, the preferably substantially smooth major side 12, 12' and 12" of each sheet 10, 10' and 10" forms part of the exposed inner tubular or, more particularly, circumferential surface of the circular body 60 and section element 54 forming the plastic inner lining of that body and element. The matingly engaged pairs of first and second connectors 20, 30' and 20", 30 project with the Y-shaped engagement members 40 from the remaining side 14, 14' and 14" of the respective sheets 10, 10' and 10" into the concrete of the body 60 and are embedded therein. As is best seen in FIG. 5, each pair of matingly engaged connectors 20, 30' and 20", 30 increases in the width dimensions of their respective sheets, at least along part of their height, beyond the stem portion of each of those connectors, while the engaged connectors project generally transversely, and as installed, typically radially, away from the remaining major sides 14 of those sheets and into the concrete. The mated connectors at least partially secure those sheets 10, 10', 10" to the body 60. The length dimension of each of the sheets 10, 10' and 10" is parallel with respect to one another and is substantially equal to the axial length of the circular section 54. On the approximately 12.57 inch wide sheets 10, the engagement members 40 can be spaced about 2.1 inch from one another and about one inch from an adjoining connector 20 or 30. The engagement members 40 might project about 0.3 inch from the adjoining side 14 while the connectors 20 and 30 might project between about 0.5 and 0.6 inch from side 14.

Figure 6:
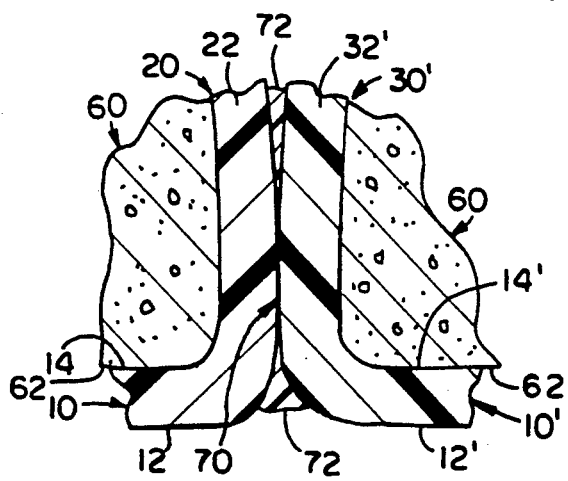
FIG. 6 is an enlarged detail of the encircled area at the right side of FIG. 5.

FIGS. 5 and 6 depict, at least diagrammatically, another important aspect of the invention. The first and second connectors 20 and 30 are preferably configured in a manner so as to form compression joints between the adjoining, matingly engaged sheets 10, 10' and 10, 10", at least when the smooth major side of each of the matingly engaged sheets is concavely flexed as are sheets 10, 10' and 10" in FIG. 5. FIG. 6 depicts in enlarged detail the junction of the stem 22 and 32' of each connector 20, 30' and the respective remaining portion of each sheet 10, 10'. The compression joint is located between the stems 22, 32', generally about the point indicated at 70. The compression joint 70 is formed as a consequence of the second connector 30' pivoting in the cavity of the first connector 20 when the sheets 10, 10' are concavely flexed on their smooth major side 12, which forces the stems 22, 32' together.

Preferably, bonding means, indicated generally at 72, is provided between the first and second connector means 20, 30' for bonding the first and second sheets 10, 10' together along the compression joint 70. Preferably, the bonding means 72 is also at least substantially inert and resistive to the corrosive materials and/or gases which may be contained by the element 54. The binding means 70 preferably, provides a continuous barrier in the compression joint 70 along the joined edges of the sheets 10, 10', which is essentially if not absolutely impervious to the liquids and gases contained by the sheets in the concrete element 54.

To further bias together the stems 22, 32 of matingly engaged first and second connectors 20 and 30, opposing cam surfaces are preferably provided on each of the first and second connectors 20 and 30, respectively. Referring back to FIG. 2, a preferably planar cam surface 27 is provided in the cavity 26 of the first connector hook shape structure 24. Cam surface 27 is preferably substantially parallel to the adjoining remaining surface 14 of the sheet 10. The bulbous structure 34 of the second connector 30 is provided with a preferably planar complementary cam surface 35 which faces and adjoins the cam surface 27 of the first connector 20 when the bulbous structure 34 of the second connector 30 is matingly engaged in the cavity 26 of the first connector 20. The cam surface 35 preferably is pitched down towards the plane of the remaining surface 14 as the cam surface 35 projects away from the remainder of the sheet 10. Preferably, the cam surface 35 is pitched at about a fifteen degree angle with respect to the plane of the remaining major side 14, which is substantially horizontal in FIG. 2.

If desired, the adjacent cam surfaces 27 and 35 could be formed in opposite, generally mirror image arrangements compared to the orientation shown in the drawings so long as their compressive function remains substantially unaffected. Thus, cam surface 27 could be on the opposite side of the cavity 26 and cam surface 35 would project towards rather than away from the remainder of the sheet 10.

The height of the bulbous structure 34 and cavity 26 are further adjusted so that the hook-shaped structure 24 tends to press the cam surface 35 of the second connector against the cam surface 27 of the first connector, which in turn biases the stem 32 of the second connector against the stem 22 of the first connector. The first and second connectors and their cam surfaces can be adjusted to create a compression joint between the stems of the connectors even when the matingly engaged sheets 10 are substantially flat, if that is desired. Also, the projection of the connectors relatively deeply into the concrete so that the compression joint is substantially if not entirely embedded as well, helps assure the maintenance of the seal. Use of cement or the like also prevents capillary flow of liquid or gas between the sheets as sometimes occurs with sheets which are just clamped together or "sealed" only by friction fit.

Use of the plastic sheets 10 of the present invention in constructing tubular concrete structural elements, like the circular sections 54, is straightforward. A plurality of the sheets are connected with one another by progressively sliding a second connector of one sheet through an adjoining first connector of another sheet, the smooth surfaces of the sheets being concavely flexed and a sufficient number of the sheets joined to form a tubular structure having an inner circumferential surface of an integer diameter. Thus assembled, compression joints are formed between the matingly engaged connectors. Preferably, the tubular structure is laid on its side and each pair of adjoining sheets flattened or deflected in an opposite direction about the joint to spread the connector stems and permits the application of the aforesaid PVC cement or other applied bonding agent between the connector stems. Upon release, the adjoining sheets will tend to flex back to their original configuration, reestablishing the compression joint in the area where the bonding agent was applied. Construction of a pipe thereafter proceeds in a conventional fashion. The plastic tubular form is mated with a preferably expandable core or mandrel which presses the tubular plastic structure into a circular cross section and supports the plastic during concrete pouring. The plastic form and its core are placed in a larger annular form and concrete supplied between the core and annular form to form the cylindrical concrete body of the pipe. The resulting structural element is thereafter cured.

A conventional, PVC cement such as, for example, "WELD ON SAFE 'n EASY$^{800}$", is preferred for use with the preferred "rigid" PVC sheets 10. This product is supplied by IPS Corp. of Gardena, Calif. and is described as a clear, virgin PVC resin with a Brookfield viscosity of 400-900 cps. Residue of such a bonding means is indicated diagrammatically at 72 in FIG. 6. One of ordinary skill will appreciate that other types of adhesives, solvents, cements, glues, etc. may be used for bonding sheets together along the compression joint 70 and further that it may be possible to bond the sheets together along the compression joints 70 in other ways such as, for example, thermal welding. The weldment would constitute the bonding means in such instance. The above-identified cement is further preferred in that, when properly applied and cured, it will provide an essentially liquid and gas impermeable seal between the sheets, which exhibits good resistance to sulfides found in sewer gases.

Referring back to FIG. 4, there is shown yet another important aspect of the invention. The cross-sectioned sheet 10 and each other identical sheet 10 mounted on the upper circular element 54 extends at least substantially along and preferably all along the entire length of the inner circumferential surface of the concrete body 60 to edges of the body indicated at 64 and 66, respectively, formed between the inner circumferential surface 62 and the adjoining, generally annular end surface 65 and 67, respectively, of the concrete body. The sheets 10 thus completely cover the inner circumferential surface 62 of the body 60.

The concrete element 54 preferably includes, in addition to the concrete body 60 and plurality of identical sheets 10, a pair of synthetic polymeric plastic, preferably identical end members 80. Each end member 80 has a generally L-shaped cross section, which can be seen in FIG. 4, formed by first and second intersecting legs 82 and 84, respectively. First leg 82 of each end member 80 is preferably bonded to the one, smooth major side of each of the plurality of sheets 10, overlapping the longitudinal end portions of each of those sheets 10. The second leg 84 of each end member 80 extends over the respective edge 64, 66 of the concrete body 60 so as to overlie the first and second connectors 20, 30 and each engagement member 40 of each sheet 10 where those components of the sheet would be exposed in cross-sectional width profile at the end surfaces 65 and 67 of the concrete body 60. Preferably, the second leg 84 is also bonded to the underlying concrete surface of the body and to sheets 10 to the extent they are exposed on the end surfaces 65 and 69, to substantially retard, if not prevent, capillary action in vertical installations of the concrete structural elements of the invention such as the manhole conduit structure 50 depicted. The exposed surfaces of each of the second legs 84 form smooth, planar circumferential surfaces on the annular ends 65 and 67 of the concrete body 60 and element 54. These end members are preferably applied with the aforesaid PVC cement or other suitable bonding agent after casting and curing of the concrete bodies. As is conventional, the concrete body 60 may be configured at each end surface 65 and 67 to provide mating structural elements such as the indicated annular, projecting mating structure 68 provided on the lower end surface 65 and the complementary configured, annular groove 69 provided on the upper end surface 67 of the body 60 of the upper element 54. As can be seen, these structural features can be provided to mate with other, complementary features on others of the concrete structural elements 52 and 54.

FIG. 4 depicts yet another aspect of the invention: the preferred joining of individual concrete elements 52 and 54 of the invention into an essentially leakproof concrete conduit structure or system, namely, the manhole 50. The upper and lower circular sections 54 are in end-to-end abutment with each other, one tubular end of each concrete body and one second leg of one plastic end member 80 of each body facing and adjoining the other. In reality, the individual elements 52, 54 would be much closer to one another with the male mating structure 68 of the upper element 54 extending into and engaging with the complementary groove 69 of the lower element 54 to limit radial movement of the sections. However, the members 52 and 54 have been spaced apart in FIG. 4 to illustrate sealing means indicated generally at 90 in the drawings and formed between the facing and adjoining ends 65 and 67 of end-to-end abutted upper and lower members 54, for sealing a joint 88 between the members 54 against fluid leakage. Preferably, the sealing means 90 comprises a bead of a synthetic, elastomeric caulk, indicated at 92, which extends entirely around the joint 88 on the inner circumferential surface of each element 54. The caulk may be, for example, PRC Rubber Calk ® 7000 seal, distributed by Products Research & Chemical Corporation of Gloucester City, N.J. This is described as a polysulfide, polymeric material and has been found to bond well to at least "rigid" PVC preferred in the present invention. Preferably too, a compressible backing 94, such as a polymeric foam tube, is provided in the joint 88, spaced radially outwardly from the corners of the plastic end members 80 to define a cavity with those adjoining end members 80 of an appropriate dimension for the caulk bead 92 provided. Polyurethane foam tubing, for example, about ⅜ inch in diameter, is suggested. The described caulk bead 92 forms an essentially impermeable barrier to sewage and sewer gases, at least at atmospheric pressure levels.

Still referring to FIG. 4, the flat section 52 of the manhole structure 50 illustrates another aspect of the invention, namely the possible use of the sheets 10 on a planar surface, such as the lower surface 59 of the concrete body 58 of flat top 52, which substantially defines that element. Sheet(s) 10 used to cover that lower surface 59 are matingly engaged by their adjoining first and second connectors, respectively, as indicated previously, but are laid flat for embedment in the concrete of the body 58. Depending upon the manner in which the structural element 52 is formed, the flat sheet(s) 10 may be precut in a circular form with a circular, eccentrically located opening positioned at the access opening 56 of the element, cast into the element 52 in uncut form and cut thereafter, or initially cut into a substantially circular form, cast into the concrete and then cut along the access opening 56 to provide an unrestricted passageway through the element. The projecting connectors 20, 30 and engagement elements 40 of each sheet 10 projection into the concrete bodies 58 and 60 are depicted diagrammatically by broken lines in FIG. 4 running in the concrete parallel to the depicted cross section of each sheet 10.

Figure 7:
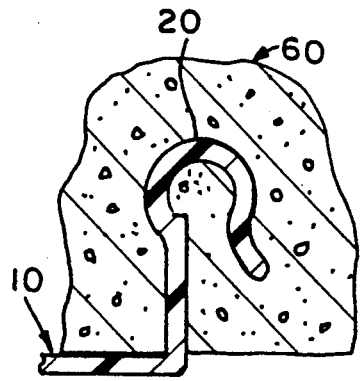
FIGS. 7 and 8 are [diagrammatic] cross-sections of concrete structural elements incorporating a flexible sheet of FIGS. 1 and 2 in which first and second connectors provided on opposing edges of the sheet are individually embedded in the concrete of the structural element.
Figure 8:
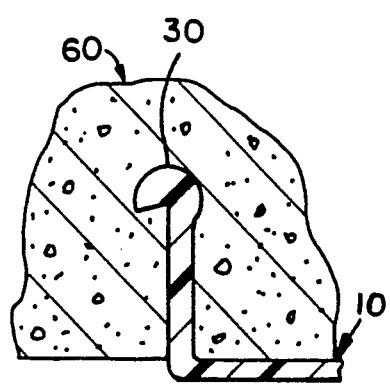

In certain uses of the sheets 10 of the present invention, for example, like the planar application of the sheets 10 the flat top 52, the first and second connectors 20 and 30 of the sheet 10 may be embedded in concrete without being matingly engaged with a complementary connector. This situation is illustrated diagrammatically in FIGS. 7 and 8 for the first and second connectors 20 and 30, respectively. In another important aspect of the invention, each individual connector 20 and 30 has a generally flaring shape. That is, the width dimension of the connector, which corresponds to the width dimension of the sheet, increases along at least some portion of the connector while the connector projects away from the remainder of the sheet 10. This flaring of each connector 20, 30 results in the connector being engaged interferingly with the concrete, after the concrete has cured, when the individual connector is embedded in the concrete before curing. This interfering engagement between each individual connector 20, 30 and the concrete helps to assure that the ends of each sheet 10 will remain embedded in the concrete While the presently preferred arrangements of the invention have been disclosed, variations on those arrangements would occur to those of skill in this art. For example, although it is presently preferred that the sheets be extruded in a generally flat configuration, the sheets could be extruded with a curved width profile. Also, the stems of the connectors can be oriented at a more pitched rather than essentially perpendicular orientation to the sheet to augment or eliminate a biasing effect to close or open joints between adjoining connectors, as desired. While generally round hook-shaped structures and bulbous structures are described for the first and second connectors, respectively, more angular structures, such as general triangularly shaped structures, can be substituted or entirely different connector configurations employed. For example, while certain concrete structural elements and their use in the construction of one type of manhole structure have been disclosed, other concrete structural elements, such as pipes, other manhole constructions and other concrete structures which might benefit from the teaching of the present invention are known and are intended to be encompassed by the invention. Thus, the present invention may be embodied in other specific forms without departing from the spirit or essential attributes thereof. Accordingly, reference should be made to the appended claims rather than to the foregoing specification, as indicating the scope of the invention.

I claim:

1. A resiliently flexible, synthetic polymeric plastic sheet comprising a pair of opposing, major sides, the sheet having a pair of opposing first and second edges extending along a length dimension of the sheet, the length dimension being perpendicular to a width dimension of the sheet, the width dimension extending between the first and second edges, the sheet further comprising one major side and first and second connectors projecting transversely from a remaining major side and extending respectively along the first and second edges, the first and second connectors being configured to matingly engage with connectors substantially identical to second and first connectors, respectively, provided on other, similar sheets, each of the first connectors including a projecting, generally hook-shaped structure and each of the second connectors including a projecting head portion configured for receipt in the hook-shaped structure, and each of the first and second connectors further being configured to engage by interference with cured concrete when the connector is embedded in concrete up to the remaining side of the sheet before the concrete has cured.

2. The sheet of claim 1 further comprising a generally Y-shaped engagement member projecting from the remaining side thereof, the engagement member including a base extending generally perpendicularly from the remaining major side of the sheet and a pair of arms supported by the base and diverging from one another and from the remaining major side of the sheet, the base having a thickness in a direction parallel to the width dimension less than a combination of thicknesses of the two arms, and the sheet having a cross-sectional width profile unchanging along the length dimension of the sheet.

3. The sheet of claim 2 further comprising a plurality of the Y-shaped engagement members extending from the remaining major side of the sheet the plurality of the Y-shaped engagement members extending in generally parallel planes with respect to one another substantially entirely along the length of the sheet.

4. The sheet of claim 3 wherein the Y-shaped members and the first and second connectors are integrally and monolithically formed with the sheet as part of the sheet.

5. The sheet of claim 4 wherein the width dimension of the sheet between the first and second edges is about pi times an integer.

6. The sheet of claim 1 wherein the width dimension of the sheet between the first and second edges is about pi times an integer.

7. The sheet of claim 1 wherein the hook-shaped structure of the first connector includes a cavity with an open mouth for receiving at least the projecting head portion of a mating second connector substantially identical to the second connector of the sheet, the open mouth having a dimension less than a larger dimension of the cavity and a larger dimension of the projecting head portion of the mating second connector so as to retain the larger dimension portion of the mating second connector within the cavity of the first connector when the larger dimension portion of the mating second connector is positioned within the cavity of the first connector.

8. The sheet of claim 7 wherein the hook-shaped structure of the first connector and the portion of the second connector of the sheet are each supported on separate stems projecting generally perpendicularly from the remaining side of the sheet along the respective first and second edges.

9. A concrete structural element comprising:
a concrete body substantially defining the element; and
first and second resiliently flexible, synthetic polymeric plastic sheets on a surface of the concrete body, each of the first and second sheets including a pair of opposing, major sides, one major side of each sheet forming an exposed surface of the element, a remaining major side of each sheet facing and intimately contacting the surface of the concrete body, each sheet having a pair of opposing first and second edges extending along a length dimension of the sheet, the length dimension of each sheet being perpendicular to a width dimension of the respective sheet, the width dimension extending between the first and second edges of the respective sheet, each sheet further including first and second connectors projecting transversely to the remaining major side of the sheet and extending respectively along the first and second edges of the sheet, the first connector of the first sheet having a projecting hook portion matingly receiving a suitably configured projecting head portion of the second connector of the second sheet, the engaged first and second connectors projecting from the remaining sides of the first and second sheets into the concrete of the concrete body and the engaged first and second connectors being shaped and embedded sufficiently in the concrete to engage with and at least partially secure the first and second sheets to the concrete body.

10. The element of claim 9 wherein the engaged first and second connectors form a compression joint between the first and second sheets, at least when the one side of each of the first and second sheets is concavely flexed.

11. The element of claim 10 further comprising bonding means between the first and second connectors for bonding the first and second sheets together along the compression joint.

12. The element of claim 9 further comprising bonding means between the first and second connector means for bonding the first and second sheets together.

13. The element of claim 9 wherein the hook portion of the first connector comprises a generally hook-shaped structure having a cavity with an open mouth matingly receiving at least the projecting head portion of the second connector, the open mouth having a dimension less than a larger dimension of the cavity and a larger dimension of the projecting head portion of the second connector received in the cavity whereby the larger dimension head portion of the second connector is retained in the cavity by the mouth of the hook-shaped structure.

14. The element of claim 9 wherein each of the first and second sheets further includes a generally Y-shaped engagement member projecting from the remaining side thereof into the concrete further securing each sheet to the concrete body, the engagement member including a base extending generally perpendicularly from the remaining side of the respective sheet and a pair of arms supported by the base and diverging from one another and from the remaining side of the respective sheet, the base having a thickness in a direction parallel to the width dimension less than a combination of thicknesses of the two arms whereby a space formed in the concrete by the presence of the base is less than the combined thicknesses of the two arms to resist passage of the two arms through the space and to prevent the Y-shaped member from pulling out of the concrete, and the sheet having a cross-sectional width profile unchanging along the length of the sheet.

15. The element of claim 14 further comprising a plurality of the Y-shaped engagement members projecting from the remaining side of each sheet.

16. The element of claim 9 wherein each of the first and second sheets extends to an edge of the concrete body and further comprising a synthetic, polymeric plastic end member having a generally L-shaped cross section formed by first and second intersecting legs, the first leg of the end member being bonded to the one major side of each of the first and second sheets and the second leg of the end member extending over the edge of the concrete body so as to overlie the first and second connector means.

17. The element of claim 16 wherein the concrete body is generally tubular and wherein a plurality of identical, interconnected flexible plastic sheets, including the first and second sheets, fully cover an inner tubular surface of the body.

18. The element of claim 17 further comprising a synthetic, polymeric plastic end member having a generally L-shaped transverse cross section formed by first and second intersecting legs, the first leg of the end member being bonded to one major side of each of the plurality of sheets exposed on the inner tubular surface at one end of the concrete body and the second leg of the end member extending over at least a portion of an end surface of the concrete body adjoining the inner tubular surface at the one end of the concrete body.

19. A concrete structure comprising at least two concrete structural elements of claim 18 in end-to-end abutment with each other, the one tubular end and plastic end member of each element facing and adjoining the one tubular end and plastic end member of the other element.

20. The concrete structure of claim 19 further comprising sealing means for sealing against fluid leakage a joint between the facing ends and facing plastic end members.

21. The concrete structure of claim 20 wherein the sealing means comprises an elastomeric caulk extending around the elements between the facing end members in the joint.

22. The element of claim 9 wherein each of the first and second sheets has a uniform width dimension of about pi times an integer.

23. The sheet of claim 2 wherein the thickness of the base of each engagement member is approximately equal to the thickness of each of the two arms of the engagement member.

24. The element of claim 14 wherein the thickness of the base of each engagement member is approximately equal to the thickness of each of the two arms of the engagement member.

25. The element of claim 12 wherein each of the first and second sheets has a cross-sectional width profile unchanging along the length dimension of the sheet.

26. The element of claim 13 wherein each of the first and second sheets has a cross-sectional width profile unchanging along the length dimension of the sheet.

27. The sheet of claim 23 having a cross-sectional width profile unchanging along the length dimension of the sheet.

* * * * *